(12) United States Patent
Yamamoto et al.

(10) Patent No.: US 11,920,939 B2
(45) Date of Patent: Mar. 5, 2024

(54) ROUTE SEARCH DEVICE, ROUTE SEARCH METHOD, AND PROGRAM

(71) Applicant: NIPPON TELEGRAPH AND TELEPHONE CORPORATION, Tokyo (JP)

(72) Inventors: Chihiro Yamamoto, Tokyo (JP); Hiroshi Konishi, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 358 days.

(21) Appl. No.: 17/292,692

(22) PCT Filed: Oct. 29, 2019

(86) PCT No.: PCT/JP2019/042332
§ 371 (c)(1),
(2) Date: May 10, 2021

(87) PCT Pub. No.: WO2020/100571
PCT Pub. Date: May 22, 2020

(65) Prior Publication Data
US 2022/0011124 A1    Jan. 13, 2022

(30) Foreign Application Priority Data
Nov. 12, 2018 (JP) .................... 2018-212497

(51) Int. Cl.
*G01C 21/34* (2006.01)
(52) U.S. Cl.
CPC ................. *G01C 21/3461* (2013.01)
(58) Field of Classification Search
CPC .................................... G01C 21/3461
See application file for complete search history.

(56) References Cited

U.S. PATENT DOCUMENTS 9,903,720 B2 * 2/2018 Morlock ............... G06F 16/29
10,514,263 B2 * 12/2019 Maru .................. G01C 21/362
(Continued)

FOREIGN PATENT DOCUMENTS

JP    2003240592 A    8/2003
JP    200437269 A     2/2004
(Continued)

OTHER PUBLICATIONS

Kubota et al. (2001) "Proposal and Evaluation of Pedestrian Navigation System" Information Processing Society of Japan Journal, vol. 42, No. 7.
(Continued)

*Primary Examiner* — Michael A Berns

(57) ABSTRACT

It is intended to allow an appropriate route search to be performed even with a geographical NW in which accessibility information includes an uninvestigated link. A route appropriateness value calculation unit 160 calculates, for each of a plurality of routes each connecting a departure point and a destination extracted by a route extraction unit 120 and including links connecting individual spots including the departure point and the destination, a route appropriateness value of the route. The route appropriateness value of the route is calculated on the basis of a cost of the route calculated by a cost calculation unit 140 on the basis of a cost representing a degree of passage difficulty which is determined for each of the links with respect to a transportation means on the basis of accessibility information of the investigated link as well as a degree of passage uncertainty representing a possibility that the route cannot be passed through by the transportation mean which is calculated by a passage uncertainty degree calculation unit 150 on the basis of a length of the uninvestigated link included in the route. A route selection unit 180 selects, from among the plurality (Continued)

of routes, the route on the basis of the route appropriateness value of the route.

20 Claims, 4 Drawing Sheets

(56) References Cited

U.S. PATENT DOCUMENTS

| | | | |
|---|---|---|---|
| 10,684,134 B2 * | 6/2020 | Ebner | G01C 21/3822 |
| 2005/0256885 A1 | 11/2005 | Yairi et al. | |
| 2022/0011124 A1 * | 1/2022 | Yamamoto | G09B 29/10 |

FOREIGN PATENT DOCUMENTS

| | | | |
|---|---|---|---|
| JP | 200591372 A | 4/2005 | |
| JP | 2017102279 A | 6/2017 | |

OTHER PUBLICATIONS

Yamamoto et al. (2016) "Barrier-Free Information Surveying Tool to Support the Mobility of Pedestrian" IEICE Technical Report, vol. 116, No. 23, pp. 39-44.

* cited by examiner

Fig. 1
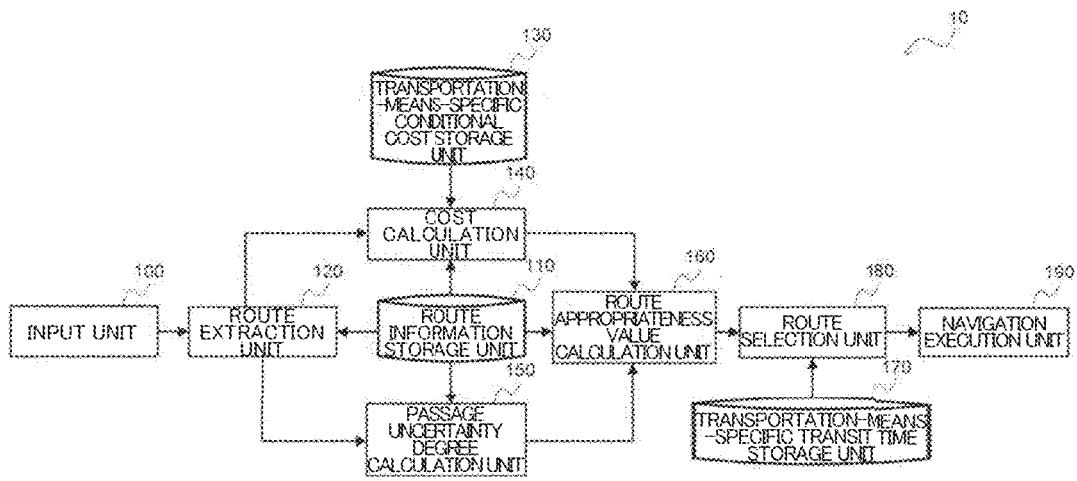
Fig. 2
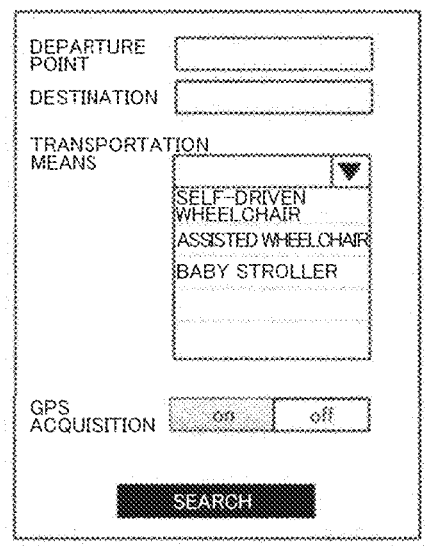
Fig. 3
| ID | TRANSPORTATION MEANS |
|---|---|
| 1 | SELF-DRIVEN WHEELCHAIR |
| 2 | ASSISTED WHEELCHAIR |
| 3 | BABY STROLLER |
| ... | |
EXAMPLE OF TRANSPORTATION MEANS LIST

Fig. 4

| LINK ID | LENGTH | ROUTE TYPE | LONGITUDINAL GRADIENT | ROUTE WIDTH | ... | ... |
|---|---|---|---|---|---|---|
| L1 | 5m | SLOPING ROAD | 5 | 1m | ... | ... |
| L2 | 10m | FLAT ROAD | 0 | 0.8m | ... | ... |
| L3 | 20m | SLOPING ROAD | 1 | 2m | ... | ... |
| L4 | 10m | - | - | - | - | - |

EXAMPLE OF ACCESSIBILITY INFORMATION

Fig. 5

| LINK ID | LINK LENGTH |
|---|---|
| L111 | p1 |
| L112 | p2 |
| L113 | p3 |
| L114 | p4 |

EXAMPLE OF LINK LENGTH

Fig. 6

| LINK ID | ABLE-BODIED PERSON C1 | MANUAL WHEELCHAIR C2 | ASSISTED WHEELCHAIR C3 | BABY STROLLER C4 | CANE C5 |
|---|---|---|---|---|---|
| L111 | 100 | 0 | 3 | 0 | 0 |
| L112 | 1 | 1 | 1 | 0 | 0 |
| L113 | 1 | 0 | 0 | 2 | 0 |
| L114 | 20 | 1 | 0 | 0 | 1 |

EXAMPLE OF TRANSPORTATION-MEANS-SPECIFIC PAST PASSAGE RECORD

Fig. 7

| CONDITION | PEDESTRIAN | WHEELCHAIR | WHEELCHAIR (ASSISTED) | CANE | BABY STROLLER |
|---|---|---|---|---|---|
| CONDITION 1 (SLOPING ROAD) | 1 | 10000 | 10000 | 1 | 50 |
| CONDITION 2 (FLAT) | 1 | 1000 | 1000 | 50 | 10000 |
| ... | ... | ... | ... | ... | ... |
| CONDITION: UNINVESTIGATED | 1 | 1 | 1 | 1 | 1 |

TRANSPORTATION-MEANS-SPECIFIC PASSAGE COST UNDER SPECIFIED CONDITION

Fig. 8

| LINK ID | PEDESTRIAN | WHEELCHAIR | WHEELCHAIR (ASSISTED) | CANE | BABY STROLLER |
|---|---|---|---|---|---|
| L1 | 5 | 50000 | 250 | 50 | 250 |
| L2 | 10 | 10000 | 10000 | 10 | 10 |
| L3 | 20 | 20 | 20 | 20 | 20 |
| L4 | 10 | 10 | 10 | 10 | 10 |

TRANSPORTATION-MEANS-SPECIFIC ROUTE SEARCH COST

Fig. 9
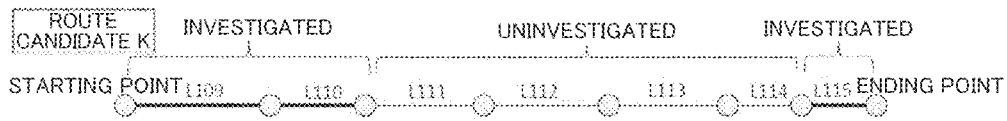
Fig. 10
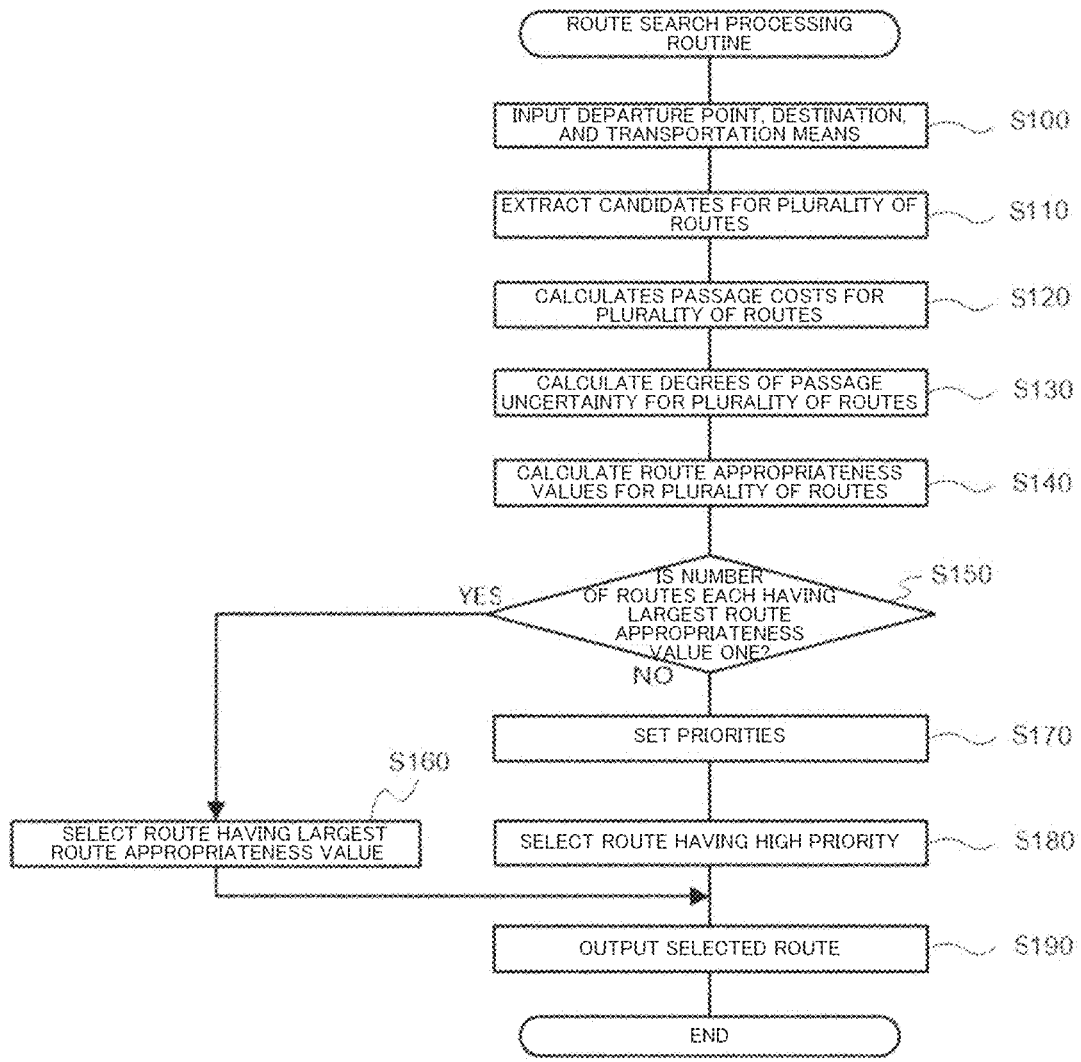
Fig. 11

ROUTE SEARCH DEVICE, ROUTE SEARCH METHOD, AND PROGRAM

CROSS-REFERENCE TO RELATED APPLICATIONS

This application is a U.S. 371 Application of International Patent Application No. PCT/JP2019/042332, filed on 29 Oct. 2019, which application claims priority to and the benefit of JP Application No. 2018-212497, filed on 12 Nov. 2018, the disclosures of which are hereby incorporated herein by reference in their entireties.

TECHNICAL FIELD

The present invention relates to a route search device, a route search method, and a program, and particularly relates a route search device, a route search method, and a program that performs a route search using accessibility information including an uninvestigated route.

BACKGROUND ART

There has conventionally been a pedestrian navigation system that searches for a pedestrian route connecting a current location (departure point) of a user and a destination and presents a route to the destination to the user (NPL 1).

As barrier-free concepts have been promoted in recent years, it is required to perform an appropriate route search for each of users including even a user of a transportation means for which conditions for passable routes are different from those for an able-bodied person, such as a senior person or a wheel-chair user.

To perform a route search appropriate for each of the users, it is necessary to transform passage conditions (hereinafter referred to as accessibility information) given to links on a geographical NW (network) to route search costs for individual transportation means and allocate the route search costs to the links (FIG. 12).

With this regard, to collect the accessibility information, a method which collects the accessibility information by, e.g., an accessibility information investigation performed by volunteers has been studied (NPL 2).

Meanwhile, a map information investigation support device in PTL 1 allows a result of an investigation performed on features and routes on a map by a traveling investigator to be recorded in association with a geographical network and thereby supports a map information investigation.

CITATION LIST

Patent Literature

[PTL 1] Japanese Patent Application Publication No. 2015-235463

Non Patent Literature

[NPL 1] Koji Kubota, Fumihiko Maeda, and Yasufumi Kikuchi, "Proposal and Evaluation of Pedestrian Navigation System", IPSJ Transaction, Vol. 42, No. 7, July 2001.

[NPL 2] Chihiro Yamamoto et al., "Barrier-Free Information Surveying Tool to Support the Mobility of Pedestrian", IEICE Technical Report, Vol. 116, No. 23, LOIS2016-8, May 2016, pp. 39-44.

SUMMARY OF THE INVENTION

Technical Problem

However, even though an investigation of the accessibility information is promoted in each place, under existing conditions, the accessibility information is not provided for all the routes throughout Japan.

Accordingly, investigated links and uninvestigated links are present on a geographical NW and, when a route search is performed only with a NW having the accessibility information, a case occurs in which a route to a destination cannot be secured or results in a circuitous route (FIG. 13).

The present invention has been achieved in view of the points described above, and an object of the present invention is to provide a route search device, a route search method, and a program which allow an appropriate route search in accordance with a transportation means to be performed even with a geographical NW in which accessibility information includes an uninvestigated link.

Means for Solving the Problem

A route search device according to the present invention is configured to include: an input unit that receives a transportation means, a departure point, and a destination each input thereto; a route extraction unit that extracts a plurality of routes each connecting the departure point and the destination and including links connecting individual spots including the departure point and the destination; a cost calculation unit that calculates, for each of the plurality of routes extracted by the route extraction unit, a cost of the route on the basis of a cost representing a degree of passage difficulty which is determined for each of the links with respect to the transportation means on the basis of accessibility information of the investigated link; a passage uncertainty degree calculation unit that calculates, for each of the plurality of routes, a degree of passage uncertainty representing a possibility that the route cannot be passed through by the transportation means on the basis of a length of the uninvestigated link included in the route; a route appropriateness value calculation unit that calculates, for each of the plurality of routes, a route appropriateness value of the route on the basis of the passage cost of the route and the degree of passage uncertainty of the route; and a route selection unit that selects, from among the plurality of routes, the route on the basis of the route appropriateness value of the route.

A route search method according to the present invention includes the steps of: an input unit receiving a transportation means, a departure point, and a destination each input thereto; a route extraction unit extracting a plurality of routes each connecting the departure point and the destination and including links connecting individual spots including the departure point and the destination; a cost calculation unit calculating, for each of the plurality of routes extracted by the route extraction unit, a cost of the route on the basis of a cost representing a degree of passage difficulty which is determined for each of the links with respect to the transportation means on the basis of accessibility information of the investigated link; a passage uncertainty degree calculation unit calculating, for each of the plurality of routes, a degree of passage uncertainty representing a possibility that the route cannot be passed through by the transportation means on the basis of a length of the uninvestigated link included in the route; a route appropriateness value calculation unit calculating, for each of the plurality of routes, a route appropriateness value of the route on the basis of the passage cost of the route and the degree of passage uncertainty of the route; and a route selection unit selecting, from among the plurality of routes, the route on the basis of the route appropriateness value of the route.

In the route search device and the route search method each according to the present invention, the input unit receives the transportation means, the departure point, and the destination each input thereto, the route extraction unit extracts the plurality of routes each connecting the departure point and the destination and including the links connecting the individual spots including the departure point and the destination, and the cost calculation unit calculates, for each of the plurality of routes extracted by the route extraction unit, the cost of the route on the basis of the cost representing the degree of passage difficulty which is determined for each of the links with respect to the transportation means on the basis of the accessibility information of the investigated link.

In addition, the passage uncertainty degree calculation unit calculates, for each of the plurality of routes, the degree of passage uncertainty representing the possibility that the route cannot be passed through by the transportation means on the basis of the length of the uninvestigated link included in the route, the route appropriateness value calculation unit calculates, for each of the plurality of routes, the route appropriateness value of the route on the basis of the passage cost of the route and the degree of passage uncertainty of the route, and the route selection unit selects, from among the plurality of routes, the route on the basis of the route appropriateness value or the route.

By thus extracting the plurality of routes each connecting the departure point and the destination and including the links connecting the individual spots including the departure point and the destination, calculating, for each of the plurality of extracted routes, the cost of the route on the basis of the cost representing the degree of passage difficulty which is determined for each or the links with respect to the transportation means on the basis of the accessibility information of the investigated link, calculating, for each of the plurality of routes, the degree of passage uncertainty representing the possibility that the route cannot be passed through by the transportation means on the basis of the length of the uninvestigated link included in the route, calculating, for each of the plurality of routes, the route appropriateness value of the route on the basis of the passage cost of the route and the degree of passage uncertainty of the route, and selecting, from among the plurality of routes, the route on the basis of the route appropriateness value of the route, even with a geographical NW in which the accessibility information includes the uninvestigated link, an appropriate route search in accordance with a transportation means can be performed.

In the route search device according to the present invention, the cost representing the degree of passage difficulty can be determined using a value based on an assumption that the uninvestigated link is passable.

In the route search device according to the present invention, the passage uncertainty degree calculation unit can calculate, for each of the plurality of routes, the degree of passage uncertainty on the basis of the length of the uninvestigated link included in the route and a past record of passage by the transportation means through the uninvestigated link.

In the route search device according to the present invention, the route selection unit can select the route on the basis of the route appropriateness value of the route, an estimated transit time of the route, a total length of the route, or a proportion of the length of the investigated link in the route.

A program according to the present invention is a program for causing a computer to function as each of the components of the route search device described above.

Effects of the Invention

The route search device, the route search method, and the program each according to the present invention allow an appropriate route search in accordance with a transportation means to be performed even with a geographical NW in which the accessibility information includes the uninvestigated link.

BRIEF DESCRIPTION OF DRAWINGS

FIG. 1 is a schematic diagram illustrating a configuration of a route search device according to an embodiment of the present invention.

FIG. 2 is a conceptual diagram illustrating an example of an input screen for a departure point, a destination, and a transportation means according to the embodiment of the present invention.

FIG. 3 is a chart illustrating an example of a transportation means list according to the embodiment of the present invention.

FIG. 4 is a chart illustrating an example of accessibility information according to the embodiment of the present invention.

FIG. 5 is a chart illustrating an example of link lengths according to the embodiment of the present invention.

FIG. 6 is a schematic diagram illustrating an example of past passage records according to the embodiment of the present invention.

FIG. 7 is a chart illustrating an example of costs representing degrees of passage difficulty according to the embodiment of the present invention.

FIG. 8 is a chart illustrating an example of transportation-means-specific route search costs according to the embodiment of the present invention.

FIG. 9 is a chart illustrating an example of route candidates according to the embodiment of the present invention.

FIG. 10 is a chart illustrating an example of route transit times according to the embodiment of the present invention.

FIG. 11 is a flow chart illustrating a route search processing routine for the route search device according to the embodiment of the present invention.

DESCRIPTION OF EMBODIMENTS

Figure 12:
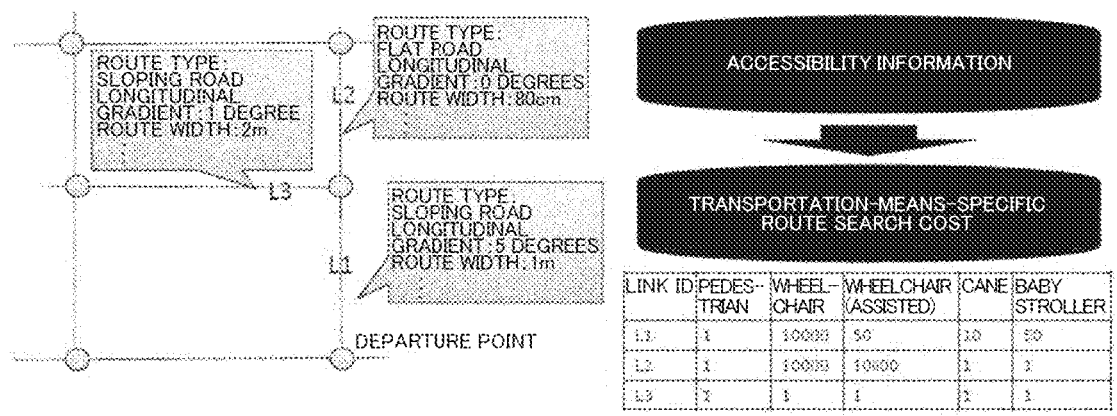
FIG. 12 is chart illustrating an example of accessibility information and the route search costs.
Figure 13:
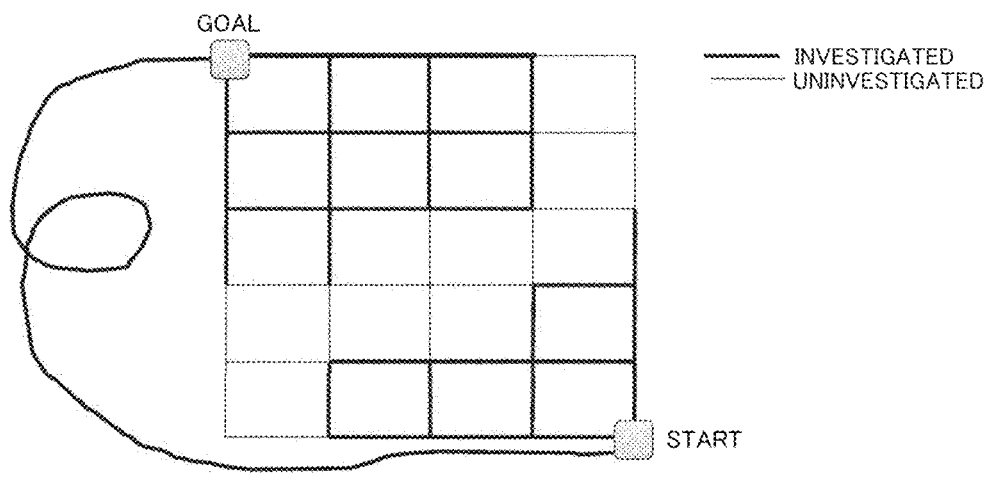
FIG. 13 is a chart illustrating an example when a route to the destination results in a circuitous route.

Using the drawings, a description will be given below of an embodiment of the present invention.

Outline of Route Search Device According to Embodiment of Present Invention

First, a description will be given of an outline of an embodiment of the present invention.

In the embodiment of the present invention, from among route candidates including investigated links and uninvestigated links on a geographical NW, routes which are highly passable and are not circuitous are extracted.

The uninvestigated links are set travelable irrespective of a transportation means, and then a route search inclusive of the uninvestigated links and the investigated links is performed, and a passage cost and a degree of passage uncertainty are determined for each of the extracted route candidates as follows.

Passage Cost=Transportation-Means-Specific Cost*Length

Degree of Passage Uncertainty=Calculation of Degree of Passage Uncertainty in Uninvestigated Route (Involving Use of Transportation Means Category Past Passage Record)

Then, the routes having lower passage costs and lower degrees of passage uncertainty are presented as the route candidates.

With such a configuration, even when a result of the route search includes the uninvestigated link having unknown accessibility information, it is possible to present the route which is highly passable and is not circuitous to a user.

Accordingly, even with the geographical NW in which the accessibility information includes the uninvestigated link, it is possible to perform an appropriate route search in accordance with the transportation means.

Configuration of Route Search Device According to Embodiment of Present Invention Referring to FIG. 1, a description will be given of a configuration of a route search device according to the embodiment of the present invention. FIG. 1 is a block diagram illustrating the configuration of the route search device according to the embodiment of the present invention.

In the present embodiment, a description will be given of a case where a route search device 10 is mounted in a mobile communication terminal such as a smartphone and performs a pedestrian navigation.

The route search device 10 includes a compute including a CPU, a RAM, and a ROM storing therein a program for executing a route search processing routine described later, which is functionally configured as follows.

As illustrated in FIG. 1, the route search device 10 according to the present embodiment is configured to include an input unit 100, a route information storage unit 110, a route extraction unit 120, a transportation-means-specific conditional cost storage unit 130, a cost calculation unit 140, a passage uncertainty degree calculation unit 150, a route appropriateness value calculation unit 160, a transportation-means-specific transit time storage unit 170, a route selection unit 180, and a navigation execution unit 190.

The input unit 100 receives a transportation means, a departure point, and a destination each input thereto.

Specifically, the input unit 100 receives the transportation means, the departure point, and the destination each input thereto via a GUI (FIG. 2) to which the transportation means, the departure point, and the destination each displayed to a user of the pedestrian navigation are input.

The departure point includes a spot where the user intends to make a departure and a current location of the user obtained by a GPS or the like. As illustrated in FIG. 2, it may also be possible to make settings for GPS acquisition and allow the user to collect GPS information during travel (when "GPS ACQUISITION" in FIG. 2 is "on").

Examples of the transportation means include walking by an able-bodied person, using a wheelchair, using an assisted wheelchair, walking with a baby stroller, and walking with a cane. For example, the GUI in FIG. 2 displays a transportation means list illustrated in FIG. 3, and the input unit 100 receives an ID corresponding to the selected transportation means input thereto.

Then, the input unit 100 gives the received transportation means, the received departure point, and the received destination to the route extraction unit 120.

In the route information storage unit 110, the geographical NW including the investigated links and the uninvestigated links is stored.

Specifically, the geographical NW includes a plurality of nodes (grid points in a left part of FIG. 12) and a plurality of links serving as routes providing connection between the nodes as illustrated in FIG. 12.

In the route information storage unit 110, for the investigated links, accessibility information serving as passage conditions given to the plurality of links, such as respective lengths of the plurality of links and route types, are also stored (FIG. 4).

In the route information storage unit 110, for the plurality of individual links included in the geographical NW, respective link lengths of the links are stored (FIG. 5).

In the route information storage unit 110, for the plurality of individual links included in the geographical NW, transportation-means-specific past passage records of the links are stored (FIG. 6).

The route extraction unit 120 extracts a plurality of routes each connecting the departure point and the destination and including the links connecting individual spots including the departure point and the destination.

Specifically, the route extraction unit 120 extracts the plurality of routes each connecting the departure point and the destination. The route extraction unit 120 uses, e.g., a Dijkstra's algorithm to perform a route search.

Then, the route extraction unit 120 gives the transportation means and the plurality of extracted routes to the cost calculation unit 140 and to the passage uncertainty degree calculation unit 150.

The transportation-means-specific conditional cost storage unit 130 stores, for each of the plurality of transportation means, costs representing degrees of passage difficulty for the transportation means under predetermined conditions (FIG. 7).

For each of the investigated links, costs each representing the degree of passage difficulty for each of the transportation means are set in advance.

Meanwhile, for each of the uninvestigated links, a value based on the assumption that the uninvestigated link is passable is used as the cost representing the degree of passage difficulty.

For example, in the present embodiment, as illustrated in FIG. 7, when a link has not been investigated yet, it is assumed that the uninvestigated link is passable, and 1 as a lowest value is set. This is intended to calculate a cost on the assumption that the uninvestigated link is "passable".

The cost calculation unit 140 calculates, for each of the plurality of routes extracted by the route extraction unit 120, the cost of the route on the basis of the cost representing the degree of passage difficulty. The cost representing the degree of passage difficulty is determined for each of the links with respect to the transportation means on the basis of the accessibility information of each of the investigated links.

Specifically, first, the cost calculation unit 140 acquires the accessibility information from the route information storage unit 110. Then, the cost calculation unit 140 acquires, from the transportation-means-specific conditional cost storage unit 130, the cost representing the degree of passage difficulty corresponding to the transportation means received from the route extraction unit 120.

Next, the cost calculation unit 140 calculates, for each of the plurality of routes, a route search cost of each of the links of the route on the basis of the accessibility information of the link and the cost representing the degree of passage difficulty of the link corresponding to the transportation means.

More specifically, the cost calculation unit 140 multiplies, for each of the links, the length of the link by the cost representing the degree of passage difficulty of the link corresponding to the transportation means to calculate the route search cost. For example, the route search cost of each of the links with respect to each of the transportation means is calculated as illustrated in FIG. 8.

The cost calculation unit 140 calculates, for each of the plurality of routes, a sum of the route search costs of the individual links included in the route, and uses the sum of the route search costs as the cost of the route.

Then, the cost calculation unit 140 gives, for each of the plurality of routes, the cost of the route to the route appropriateness value calculation unit 160.

The passage uncertainty degree calculation unit 150 calculates, for each of the plurality of routes, a degree of passage uncertainty representing a possibility that the route cannot be passed through by the transportation means on the basis of the length of each of the uninvestigated links included in the route and a past record of passage by the transportation means through the uninvestigated link.

Specifically, first, the passage uncertainty degree calculation unit 150 acquires, for each of the plurality of routes extracted by the route extraction unit 120, a link length of each of the links included in the route and the transportation-means-specific past record of passage through the link from the route information storage unit 110.

Then, the passage uncertainty degree calculation unit 150 calculates, for each of the plurality of routes extracted by the route extraction unit 120, the degree of passage uncertainty representing the possibility that the route cannot be passed through by the transportation means.

The degree of passage uncertainty is calculated using a total length of the uninvestigated links in the route on the basis of the concept that, as the length of the uninvestigated links included in the extracted route is longer, the possibility that the uninvestigated links cannot definitely be passed through is higher, i.e., the degree of uncertainty about successful passage is higher.

However, the possibility that even the uninvestigated links can be passed through is considered to be higher when there is a past record of passage by another user using the same transportation means as that used by the user A through the uninvestigated links.

Accordingly, a transportation-means-specific past passage record is used in calculating the degree of passage uncertainty to be able to reduce the degree of passage uncertainty of the link having a past record of passage using the same transportation means. The transportation-means-specific past passage record is produced herein through map matching performed by mapping a transportation-means-specific GPS movement locus of the user on the geographical NW.

More specifically, the passage uncertainty degree calculation unit 150 calculates, for each of the plurality of routes, the degree of passage uncertainty of the route using Formula (1) below.

[Formula 1]

$$\text{Degree of Passage Uncertainty} = \Sigma \text{Link Length } p(n) * a/(1+\text{Transportation-Means-Specific Past Passage Record } Ct(n)) \quad (1)$$

In Formula (1), p(n) is a link length of an uninvestigated link n, and n is a link ID of the uninvestigated link included in the route. Meanwhile, a transportation-means-specific past passage record Ct(n) is a past record of passage by a transportation means Ct through the uninvestigated link n, and a is a constant.

For example, it is assumed that consideration as given to a given route candidate K among the plurality of routes. In this case, it is assumed that the transportation means is a manual wheelchair (C2), the route candidate K includes links L109 to L115 illustrated in FIG. 9, investigated links are denoted by L109, L110, and L115, and uninvestigated links are denoted by L111 to L114.

Referring to FIG. 5, then, the respective link lengths of the uninvestigated links L111, L112, L113, and L114 are p1, p2, p3, and p4.

In FIG. 6, the respective past passage records of the uninvestigated links L111, L112, L113, and L114 are 0, 1, 0, and 1. A past passage record value of 0 means herein that there is no past passage record value.

Therefore, the degree of passage uncertainty is given by a(p1+p2/2+p3+p4/2).

Then, the passage uncertainty degree calculation unit 150 gives the degree of passage uncertainty of each of the plurality of routes to the route appropriateness value calculation unit 160.

The route appropriateness value calculation unit 160 calculates, for each of the plurality of routes, a route appropriateness value of the route on the basis of the passage cost of the route and the degree of passage uncertainty of the route.

Specifically, the route appropriateness value calculation unit 160 calculates, for each of the plurality of routes, the route appropriateness value of the route through use of the passage cost extracted by the cost calculation unit 140 and the degree of passage uncertainty calculated by the passage uncertainty degree calculation unit 150.

For example, the route appropriateness value is determined according to Formula (2) below.

[Formula 2]

$$\text{Route Appropriateness Value} = m/\text{Passage Cost} \times n/\text{Degree of Passage Uncertainty} \quad (2)$$

In Formula (2), each of m and n is a constant.

Accordingly, the investigated route has the low passage cost and is therefore highly passable, while the uninvestigated route has the low degree of passage uncertainty and is highly passable and therefore has a large route appropriateness value. In other words, it is possible to extract the highly passable route on the basis of the route appropriateness value.

Then, the route appropriateness value calculation unit 160 gives the plurality of routes and the respective route appropriateness values of the plurality of routes to the route selection unit 180.

The transportation-means-specific transit time storage unit 170 stores, for each of the plurality of transportation means, a speed (m/second) required thereby to pass through each of the routes under specified conditions (transportation-means-specific route transit time list in FIG. 10).

The route selection unit 180 selects, from among the plurality of routes, the route on the basis of the route appropriateness value of the route.

Specifically, the route selection unit 180 selects the route having the largest route appropriateness value.

When there are the plurality of routes each having the largest route appropriateness value, the route selection unit 180 selects the route from among the routes each having the largest route appropriateness values on the basis of an estimated route transit time of the route, a total length of the route, and a proportion of the investigated routes in the route.

For example, the route selection unit 180 sets priorities according to a criterion prioritized by the user from among the following criteria. Note that the criterion prioritized by the user may be set in advance by each of the users or, alternatively, the route selection unit 180 may also be configured to receive an input from the user.

Estimated Route Transit Time

The route selection unit 180 acquires a speed corresponding to the transportation means from the transportation-means-specific transit time storage unit 170, calculates, for each of the plurality of routes each having the largest route appropriateness value, an estimated transit time required thereby to pass through the route, and preferentially selects the route having the shorter estimated route transit time.

Total Length of Route

The route selection unit 180 calculates, for each of the plurality of routes each having the largest route appropriateness value, the total length or the route, and preferentially selects the route having a shorter total length.

Proportion of Lengths of Investigated Links in Route

The route selection unit 180 extracts, for each of the plurality of routes each having the largest route appropriateness value, a proportion of lengths of the investigated links in the route, and preferentially selects the route in which the investigated links have a higher length proportion.

Then, the route selection unit 180 gives the selected route to the navigation execution unit 190.

The navigation execution unit 190 executes a pedestrian navigation on the basis of the route selected by the route selection unit 180.

Mode of Operation of Route Search Device According to Embodiment of Present Invention FIG. 11 is a flow chart illustrating a route search processing routine according to the embodiment of the present invention.

When the pedestrian navigation is started, in the route search device 10, the route search processing routine illustrated in FIG. 11 is executed.

First, in Step S100, the input unit 100 receives the transportation means, the departure point, and the destination each input thereto.

In Step S110, the route extraction unit 120 extracts a plurality of routes each connecting the departure point and the destination and including links connecting the individual spots including the departure point and the destination.

In Step S120, the cost calculation unit 140 calculates, for each of the plurality of routes extracted by Step S110 described above, a cost of the route on the basis of a cost representing a degree of passage difficulty. The cost representing the degree of passage difficulty is determined for each of the links with respect to the input transportation means on the basis of the accessibility information of each of the investigated links.

In Step S130, the passage uncertainty degree calculation unit 150 calculates, for each of the plurality of routes, a degree of passage uncertainty representing a possibility that the route cannot be passed through by the input transportation means on the basis of the length of each of the uninvestigated links included in the route and a past record of passage by the input transportation means through the uninvestigated links.

In Step S140, the route appropriateness value calculation unit 160 calculates, for each of the plurality of routes, the route appropriateness value of the route for the input transportation means on the basis of the passage cost of the route and the degree of passage uncertainty of the route.

In Step S150, the route selection unit 180 determines whether or not the number of the routes each having the largest route appropriateness value is one among the of routes.

When the number of the routes each having the largest route appropriateness value is one (YES in Step S150 described above), in Step S160, the route selection unit 180 selects the route having the largest route appropriateness value from among the plurality of routes, and advances to Step 190.

Meanwhile, when the number of the routes each having the largest route appropriateness value is not one (NO in Step S150 described above), in Step S170, the route selection unit 180 sets priorities according to the criterion prioritized by the user.

In Step S180, the route selection unit 180 selects the route having the highest priority according to the criterion set in Step S170 described above.

In Step S190, the route selection unit 180 outputs the selected route to the navigation execution unit 190.

As described above, the route search device according to the embodiment of the present invention extracts the plurality of routes each connecting the departure point and the destination and including the links connecting the individual spots including the departure point and the destination. Then, the route search device according to the embodiment of the present invention calculates, for each of the plurality of extracted routes, the cost of the route on the basis of the cost representing the degree of passage difficulty. The cost representing the degree of passage difficulty is determined herein for each of the links with respect to the transportation means on the basis of the accessibility information of each of the investigated links. Then, the route search device according to the embodiment of the present invention calculates, for each of the plurality of routes, the degree of passage uncertainty representing the possibility that the route cannot be passed through by the transportation means on the basis of the length of each of the uninvestigated links included in the route. Then, the route search device according to the embodiment of the present invention calculates, for each of the plurality of routes, the route appropriateness value of the route on the basis of the passage cost of the route and the degree of passage uncertainty of the route. Then, the route search device according to the embodiment of the present invention selects, from among the plurality of routes, the route on the basis of the route appropriateness value of the route. This allows, even with a geographical NW in which the accessibility information includes the uninvestigated links, an appropriate route search in accordance with the transportation means to be performed.

Note that the present invention is not limited to the embodiment described above, and various modifications and applications can be made in the invention within the scope not departing from the gist thereof.

For example, in the embodiment described above, the route selection unit 180 is configured to select the route having the largest route appropriateness value, but the configuration of the route selection unit 180 is not limited thereto. The route selection unit 180 may also be configured to present several candidates to the user in descending order of the route appropriateness value. In this case, a display unit (not shown) displays route candidates, the input unit receives the selected route input thereto, and the navigation execution unit executes the pedestrian navigation on the basis of the selected route.

Likewise, the route selection unit 180 may also be configured to present, even when there are the plurality of routes each having the same route appropriateness value, the plurality of routes each having a shorter estimated route transit time, the plurality of routes each having a shorter total route length, or the plurality of routes in each or which the investigated links has a high length proportion according to a set criterion prioritized by the user.

The transportation means is also not limited to those shown in the embodiment described above, and can be applied to another transportation means which requires accessibility information, another transportation means which uses a tool at the time of transportation, or another transportation means having personal belongings or the like.

For example, it may also be possible that the input transportation means include transportation means using tools such as running, a Segway, a wagon, a suitcase, and a carry bag or transportation means with personal belongings such as a heavy load and a pacemaker, and the passage costs are determined in advance in accordance with these transportation means.

By way of example, the above embodiment has described the case where the route search device 10 is mounted in a mobile communication terminal such as a smartphone. However, a configuration of the route search device 10 is not limited thereto. The route search device 10 may also be configured to be mounted in a server device and provide information to a mobile communication terminal via a communication means. Alternatively, the route information storage unit 110, the transportation-means-specific conditional cost storage unit 130, or the transportation-means-specific transit time storage unit 170 may also be configured as a database on a network.

While the description has been given of the embodiment in which the program is installed in advance in the description of the present invention, the program can also be stored on a computer readable recording medium to be provided.

REFERENCE SIGNS LIST

10 Route search device
100 Input unit
110 Route information storage unit
120 Route extraction unit
130 Transportation-means-specific conditional cost storage unit
140 Cost calculation unit
150 Passage uncertainty degree calculation unit
160 Route appropriateness value calculation unit
170 Transportation-means-specific transit time storage unit
180 Route selection unit
190 Navigation execution unit

The invention claimed is:

1. A route search device comprising a processor configured to execute operations comprising:
   receiving a transportation means from a first database, a departure point, and a destination each input thereto;
   extracting, from a first database storing route information indexed based at least on the departure point, a plurality of routes each connecting the departure point and the destination and including links connecting individual spots including the departure point and the destination;
   determining, for each of the plurality of routes, a cost of a route of the plurality of routes on the basis of a cost representing a degree of passage difficulty which is determined for each of the links with respect to the transportation means on the basis of accessibility information of an investigated link retrieved from a second database, the second database storing the accessibility information indexed based at least on the investigated link of the route, and the route includes an investigated link and an uninvestigated link;
   determining, a passage uncertainty degree determiner configured to determine, for each of the plurality of routes, a degree of passage uncertainty representing a possibility that the route cannot be passed through by the transportation means on the basis of a length of an uninvestigated link included in the route retrieved from the second database, the second database further storing the uninvestigated link of the route indexed based at least on the route information, and the uninvestigated link of the route excludes accessibility information;
   determining, for each of the plurality of routes, a route appropriateness value of the route on the basis of the cost of the route and the degree of passage uncertainty of the route;
   selecting, from among the plurality of routes, a preferred route on the basis of the route appropriateness value of the route; and
   transmitting data describing the preferred route over a network to an application configured to display the data.

2. The route search device according to claim 1, wherein the cost representing the degree of passage difficulty is determined using a value based on an assumption that the uninvestigated link is passable.

3. The route search device according to claim 2, wherein the determining the degree of passage uncertainty further comprises determining, for each of the plurality of routes, the degree of passage uncertainty on the basis of the length of the uninvestigated link included in the route and a past record of passage by the transportation means through the uninvestigated link.

4. The route search device according to claim 2, wherein the selecting further comprises selecting the route on the basis of the route appropriateness value of the route, an estimated transit time of the route, a total length of the route, or a proportion of a length of the investigated link in the route.

5. The route search device according to claim 1, wherein the determining the degree of passage uncertainty further comprises determining, for each of the plurality of routes, the degree of passage uncertainty on the basis of the length of the uninvestigated link included in the route and a past record of passage by the transportation means through the uninvestigated link.

6. The route search device according to claim 5, wherein the selecting further comprises selecting the route on the basis of the route appropriateness value of the route and, an estimated transit time of the route, a total length of the route, or a proportion of a length of the investigated link in the route.

7. The route search device according to claim 1, wherein the selecting further comprises selecting the route on the basis of the route appropriateness value of the route, an estimated transit time of the route, a total length of the route, or a proportion of a length of the investigated link in the route.

8. A route search method, the method comprising:
receiving a transportation means, a departure point, and a destination each input thereto;
extracting, from a first database storing route information indexed based at least on the departure point, a plurality of routes each connecting the departure point and the destination and including links connecting individual spots including the departure point and the destination;
determining for each of the plurality of routes extracted by the route extractor, a cost of a route of the plurality of routes on the basis of a cost representing a degree of passage difficulty which is determined for each of the links with respect to the transportation means on the basis of accessibility information of an investigated link retrieved from a second database, the second database storing the accessibility information indexed based at least on the investigated link of the route, and the route includes an investigated link and an uninvestigated link;
determining for each of the plurality of routes, a degree of passage uncertainty representing a possibility that the route cannot be passed through by the transportation means on the basis of a length of an uninvestigated link included in the route retrieved from the second database, the second database further storing the uninvestigated link of the route indexed based at least on the route information, and the uninvestigated link of the route excludes accessibility information;
determining for each of the plurality of routes, a route appropriateness value of the route on the basis of the cost of the route and the degree of passage uncertainty of the route; and
selecting from among the plurality of routes, a preferred route on the basis of the route appropriateness value of the route; and
transmitting data describing the preferred route over a network to an application configured to display the data.

9. The route search method according to claim 8, wherein the cost representing the degree of passage difficulty is determined using a value based on an assumption that the uninvestigated link is passable.

10. The route search method according to claim 9, wherein the determining the degree of passage uncertainty further comprises determining, for each of the plurality of routes, the degree of passage uncertainty on the basis of the length of the uninvestigated link included in the route and a past record of passage by the transportation means through the uninvestigated link.

11. The route search method according to claim 9, wherein the selector further comprises selecting route selector selects the route on the basis of the route appropriateness value of the route, an estimated transit time of the route, a total length of the route, or a proportion of a length of the investigated link in the route.

12. The route search method according to claim 8, wherein the determining the degree of passage uncertainty further comprises determining, for each of the plurality of routes, the degree of passage uncertainty on the basis of the length of the uninvestigated link included in the route and a past record of passage by the transportation means through the uninvestigated link.

13. The route search method according to claim 12, wherein the cost representing the degree of passage difficulty is determined using a value based on an assumption that the uninvestigated link is passable.

14. The route search method according to claim 12, wherein the selecting further comprises selecting the route on the basis of the route appropriateness value of the route, an estimated transit time of the route, a total length of the route, or a proportion of a length of the investigated link in the route.

15. The route search method according to claim 8, wherein the selecting further comprises selecting the route on the basis of the route appropriateness value of the route, an estimated transit time of the route, a total length of the route, or a proportion of a length of the investigated link in the route.

16. A computer-readable non-transitory recording medium storing a computer-executable program instructions for searching a route that when executed by a processor cause a computer system to:
receive a transportation means, a departure point, and a destination each input thereto;
extract, from a first database storing route information indexed based at least on the departure point, a plurality of routes each connecting the departure point and the destination and including links connecting individual spots including the departure point and the destination;
determine for each of the plurality of routes extracted by the route extractor, a cost of a route of the plurality of routes on the basis of a cost representing a degree of passage difficulty which is determined for each of the links with respect to the transportation means on the basis of accessibility information of an investigated link retrieved from a second database, the second database storing the accessibility information indexed based at least on the investigated link of the route, and the route includes an investigated link and an uninvestigated link;
determine for each of the plurality of routes, a degree of passage uncertainty representing a possibility that the route cannot be passed through by the transportation means on the basis of a length of an uninvestigated link included in the route retrieved from the second database, the second database further storing the uninvestigated link of the route indexed based at least on the route information, and the uninvestigated link of the route excludes accessibility information;
determine for each of the plurality of routes, a route appropriateness value of the route on the basis of the cost of the route and the degree of passage uncertainty of the route; and
select from among the plurality of routes, a preferred route on the basis of the route appropriateness value of the route; and
transmitting data describing the preferred route over a network to an application configured to display the data.

17. The computer-readable non-transitory recording medium according to claim 16, wherein the cost representing the degree of passage difficulty is determined using a value based on an assumption that the uninvestigated link is passable.

18. The computer-readable non-transitory recording medium according to claim 17, wherein the determining the passage uncertainty further comprises determining, for each of the plurality of routes, the degree of passage uncertainty on the basis of the length of the uninvestigated link included in the route and a past record of passage by the transportation means through the uninvestigated link.

19. The computer-readable non-transitory recording medium according to claim 16, wherein the determining the degree of passage uncertainty further comprises determining, for each of the plurality of routes, the degree of passage uncertainty on the basis of the length of the uninvestigated link included in the route and a past record of passage by the transportation means through the uninvestigated link.

20. The computer-readable non-transitory recording medium according to claim 16, wherein the selecting further comprises selecting the route on the basis of the route appropriateness value of the route and, an estimated transit time of the route, a total length of the route, or a proportion of a length of the investigated link in the route.

\* \* \* \* \*